UNITED STATES PATENT OFFICE.

ROBERT MACKILL, OF GLASGOW, SCOTLAND.

COMPOSITION FOR SHEEP-DIPPING.

SPECIFICATION forming part of Letters Patent No. 686,411, dated November 12, 1901.

Application filed January 23, 1901. Serial No. 44,413. (No specimens.)

*To all whom it may concern:*

Be it known that I, ROBERT MACKILL, a subject of the Queen of Great Britain and Ireland, and a resident of Glasgow, Scotland, (whose postal address is 53 Bothwell street, Glasgow, Scotland,) have invented an Improved Composition for Sheep-Dipping and Analogous Purposes, of which the following is a specification.

My said invention relates to compositions for sheep-dipping and analogous purposes of the kind described in my patent No. 608,466, dated August 2, 1898, my present invention being to improve the efficiency of such compositions. As stated in that specification, alkaloid nicotin, from which acids and impurities have been separated and which is of a definite and uniform strength, is combined with cresylic acid or cresol; but it has been found in practice that in some cases when a bath is being formed from such composition unless the composition has been thoroughly stirred in the water satisfactory results are not obtained, and also in some cases the water available for use owing to its nature does not effect a complete solution of the composition even when thoroughly stirred. To overcome these defects, I by my present invention add to the nicotin and cresol a soap, such as cotton-seed-oil soap or the like, and an alkali, such as carbonate of soda. To these ingredients sulfur in the form of a powder may also be added, if desired, and ocher or other pigment may be used to impart any desired color to the composition. These ingredients are mixed with kieselguhr, which absorbs the liquid constituents and converts the composition into a powder for convenience in carriage and to facilitate transport. In some cases the sulfur, coloring-pigment, and the kieselguhr may be dispensed with.

In preparing my improved composition the soap is first dried and then ground to a powder, and the nicotin and cresylic acid having been stirred together, as described in the earlier specification hereinbefore referred to, all the materials are intimately mixed in any suitable manner.

The ingredients may be combined in various proportions, but, by way of example, I find that to form one hundredweight of the improved composition the following proportions, by weight, give satisfactory results: five parts of nicotin, seven of cresylic acid, sixty-eight of sulfur, eight of cotton-seed oil, four of alkali, four of ocher, and sixteen of kieselguhr.

When the composition is added to water, the alkali softens the water and renders the action of the active ingredients more perfect by bringing them into as complete a solution as possible. The cotton-seed-oil soap saponifies the bath, rendering it slightly viscid, so that the active ingredients in solution and the sulfur floating in the water when used will adhere better to the wool of the sheep which are being dipped.

What I claim as my invention is—

1. An improved composition for sheep-dipping and analogous purposes, and containing cresylic acid or cresol, nicotin from which the other constituents of tobacco have been separated as completely as possible, cotton-seed-oil soap and alkali, substantially as described.

2. An improved composition for sheep-dipping and analogous purposes and containing cresylic acid or cresol, nicotin from which the other constituents of tobacco have been separated as completely as possible, cotton-seed-oil soap and carbonate of soda, substantially as described.

3. An improved composition for sheep-dipping and analogous purposes, and containing cresylic acid or cresol, nicotin from which the other constituents of tobacco have been separated as completely as possible, soap, alkali, sulfur and kieselguhr, substantially as described.

In testimony whereof I have signed my name to this specification in the presence of two subscribing witnesses.

ROBERT MACKILL.

Witnesses:
 THOMAS GILFILLAN, Jr.,
 RALPH S. COXON.